United States Patent [19]
Gibbons

[11] Patent Number: 5,647,441
[45] Date of Patent: Jul. 15, 1997

[54] COMBINED TRACTOR AND DUMP TRUCK VEHICLE

[75] Inventor: Robert A. Gibbons, Marion, Mass.

[73] Assignee: Tructor Incorporated, Marion, Mass.

[21] Appl. No.: 448,190

[22] Filed: May 23, 1995

[51] Int. Cl.$^6$ ............................................. A01B 59/043
[52] U.S. Cl. ............... 172/439; 180/53.3; 180/53.61; 180/900; 280/186; 280/479.1
[58] Field of Search ........................ 172/439, 450; 180/53.3, 53.6, 53.61, 900; 280/186, 292, 455.1, 478.1, 479.1

[56] References Cited

U.S. PATENT DOCUMENTS

| | | | |
|---|---|---|---|
| 2,669,825 | 2/1954 | Preble et al. | 172/439 X |
| 2,738,847 | 3/1956 | Tomik et al. | 172/439 X |
| 2,807,127 | 9/1957 | Scheidenhelm | 172/439 X |
| 3,023,818 | 3/1962 | Miller et al. | 172/439 |
| 3,098,528 | 7/1963 | Richey et al. | 172/439 X |
| 3,255,828 | 6/1966 | Abbott | 172/439 X |
| 3,489,431 | 1/1970 | McKeon et al. | 172/439 X |
| 3,739,928 | 6/1973 | Randall | 172/439 X |
| 4,057,112 | 11/1977 | Taylor | 172/439 X |
| 4,074,639 | 2/1978 | Hodgson | 172/439 X |
| 4,357,031 | 11/1982 | Berg | 172/439 |
| 4,423,886 | 1/1984 | Taylor | 172/439 X |
| 4,424,982 | 1/1984 | Weiss | 172/439 X |
| 4,519,623 | 5/1985 | Orthman | 172/439 |
| 4,792,006 | 12/1988 | Nienhauus et al. | 180/53.3 |
| 4,887,680 | 12/1989 | Nozaka et al. | 180/53.3 |
| 5,346,018 | 9/1994 | Koster | 172/439 X |
| 5,423,394 | 6/1995 | Kendle | 172/439 X |

*Primary Examiner*—Terry Lee Melius
*Assistant Examiner*—Christopher J. Novosad
*Attorney, Agent, or Firm*—Iandiorio & Teska

[57] ABSTRACT

A self-contained, modular three-point hitch including a three-point hitch fixture with a power take off drive bearing, a pair of lifting arm mounts, a fixed third point hitch, and a channel housing a lifting arm drive device; and a lifting arm subassembly mounted in the lifting arm mounts, the lifting arm subassembly having a pair of lifting arms mounted to an outer tube, and a lifting arm drive bar extending within the outer tube, the bar including a lifting arm drive member connected to the lifting arm drive device.

4 Claims, 6 Drawing Sheets

COMBINED TRACTOR AND DUMP TRUCK VEHICLE

FIELD OF INVENTION

A combined tractor and dump truck vehicle featuring a self-contained, modular three-point hitch.

BACKGROUND OF INVENTION

Although farmers in developed countries usually have a tractor for farming and a truck for transportation, many farmers in third world countries can only afford at best one vehicle, even with government assistance. The hybrid tractor and dump truck vehicles currently on the market, however, are too expensive to be purchased and used by farmers in third world countries.

For example, Mercedes-Benz manufactures the "Unimog 1200", an all-wheel-drive vehicle which combines the features of a dump truck and a tractor. Not only is this vehicle too expensive for farmers in third world countries, it has so many specialized parts and components that uneducated and untrained farmers could not maintain or repair it. The three-point hitch assembly of this vehicle alone includes numerous working parts and a very complex hydraulic system with twelve hydraulic lines and four double acting control valves.

In response, the inventors of the invention described herein conceived of an economical and easy to maintain combined truck and dump truck vehicle which uses standardized components. The engine, transmission, drive train, and power take-off drive assemblies are off-the-shelf products that are easily maintainable and repairable.

In implementing such a design, however, it was discovered that there was no suitable three-point hitch assembly for such a vehicle. The three-point hitch assemblies of common farm tractors are not suitable because unlike a tractor, a hybrid truck/tractor vehicle includes a truck bed. The specialized three-point hitch assembly of the Mercedes-Benz vehicle described above is not suitable because it cannot be integrated with any vehicle other than the Unimog 1200.

Therefore, one aspect of the subject invention is a combined tractor and dump truck vehicle with highly economical and maintainable components and another aspect of the subject invention is a modular, self-contained three-point hitch suitable for this hybrid vehicle or even other types of vehicles.

SUMMARY OF INVENTION

It is therefore an object of this invention to provide a combined tractor and dump truck vehicle manufactured with readily available and highly reliable components which are easy to maintain and repair.

It is a further object of this invention to provide a self-contained, modular three-point hitch for such a vehicle.

It is a further object of this invention to provide such a hitch which can be removed from the vehicle and/or adjusted with respect to the vehicle chassis.

It is a further object of this invention to provide such a hitch which is constructed so that it does not interfere with the operation of the dump truck bed.

It is a further object of this invention to provide a hydraulic system for such a combined tractor and dump truck vehicle which has a minimum of working parts and includes economical components which are easily maintained and repaired.

This invention results from the realization that, although a combined tractor and dump truck vehicle can be economically manufactured from existing components, there is no existing three-point hitch assembly suitable for such a vehicle and in response a self-contained three-point hitch unit can be constructed and can even be made removable and/or adjustable by incorporating the power take-off drive beating, the lifting arms, lifting arm drive, and the fixed third point hitch all on a modular fixture mountable on the vehicle chassis.

This invention results from the further realization that if the fixture includes a top plate which mounts on the vehicle frame and if the body of the fixture extends below this top plate, then the three-point hitch will not interfere with the operation of the dump truck bed. This invention results from the further realization that a trailer ball hitch can be mounted directly on the fixture for towing trailers and the like and also that the lifting arm assembly can be constructed to easily adjust the maximum lift of the lifting arms in the field.

More generally, this invention results from the realization that the object of a combined tractor and dump truck vehicle with a modular three-point hitch manufactured with highly economical and maintainable components can be accomplished with a single hydraulic hand pump which operates both the dump truck bed and the three-point hitch.

This invention features a self-contained, modular three-point hitch. There is a three-point hitch fixture including a power take off drive bearing, a pair of lifting arm mounts, a fixed third point hitch, and a channel housing a lifting arm drive device. There is also a lifting arm subassembly mounted in the lifting arm mounts. The lifting arm subassembly includes a pair of lifting arms mounted to an outer tube and a lifting arm drive bar extending within the outer tube. The bar includes a lifting arm drive member connected to the lifting arm drive device.

The fixture is adjustable with respect to a vehicle chassis and includes a top plate mountable on a vehicle chassis, and there are means for adjusting such as a plurality of fastener holes in the top plate. Further included are means for adjusting the maximum lifting height of the lifting arms including a plurality of offset orifices through the surface of the outer tube, a complementary plurality of offset orifices through the drive bar, and a pair of fasteners extendable through the orifices.

The self-contained, modular three-point hitch further includes offset drive means for a power take off drive shaft connected to the fixture: the fixture includes a power take off shaft connector having a first drive gear, a second drive gear fixed the power take off drive bearing, and a chain extending between the first and second drive gears for allowing the power take off drive shaft to be offset with respect to the power take off drive bearing. The fixture further includes a trailer ball mount and a pair of fixed lower link assemblies.

This invention also features a combined tractor and dump truck vehicle comprising: a dump truck bed chassis; a self-contained, modular three-point hitch affixable on the truck bed chassis; a dump truck bed mountable on the chassis over the self-contained, modular three-point hitch fixture; truck bed pivot mounts for mounting the dump truck bed with respect to the chassis; a truck bed lifting drive device; a hydraulic pump connected to both the truck bed lifting drive device and the lifting arm drive device for opening both the truck bed and the three-point hitch; and a power take off drive and a power take off shaft extending between the drive and the fixture.

The hydraulic pump is hand-powered. The three-point hitch fixture includes a top plate affixable to the chassis and further includes means for adjusting the fixture with respect to a vehicle chassis such as a plurality of fastener holes in the top plate and a complementary plurality of fastener holes in the chassis.

Further included are means for adjusting the maximum lift of the lifting arms. There are offset power take off drive means on the fixture including a power take off shaft connector having a first drive gear, a second drive gear fixed to the power take off drive bearing, and a chain extending between the first and second drive gears. The fixture further includes a trailer ball mount and a pair of fixed lower link assemblies. The self-contained, modular three-point hitch for mounting on a vehicle chassis of this invention includes a top plate connectable to the chassis and a fixture body extending downwards from the top plate, the body including a power take off drive bearing, a pair of lifting arm mounts, a fixed third point hitch, and a lifting arm subassembly mounted in the lifting arm mounts. The hitch further includes a lifting arm device mount. The fixture body includes a bottom plate, side plates interconnecting the top plate and the bottom plate, and a front plate with a flat portion and an angled portion. The lifting arm mounts are fixed to the flat portion of the front plate. The power take off drive beating is fixed to the angled portion of the front plate. The angled portion of the front plate further includes a pair of lower links and the bottom plate includes a trailer ball mount. The lifting arm drive device channel mount extends transversely with respect to the side plates rearward form the front plate.

DISCLOSURE OF PREFERRED EMBODIMENT

Other objects, features and advantages will occur to those skilled in the art from the following description of a preferred embodiment and the accompanying drawings, in which.

Figure 1:
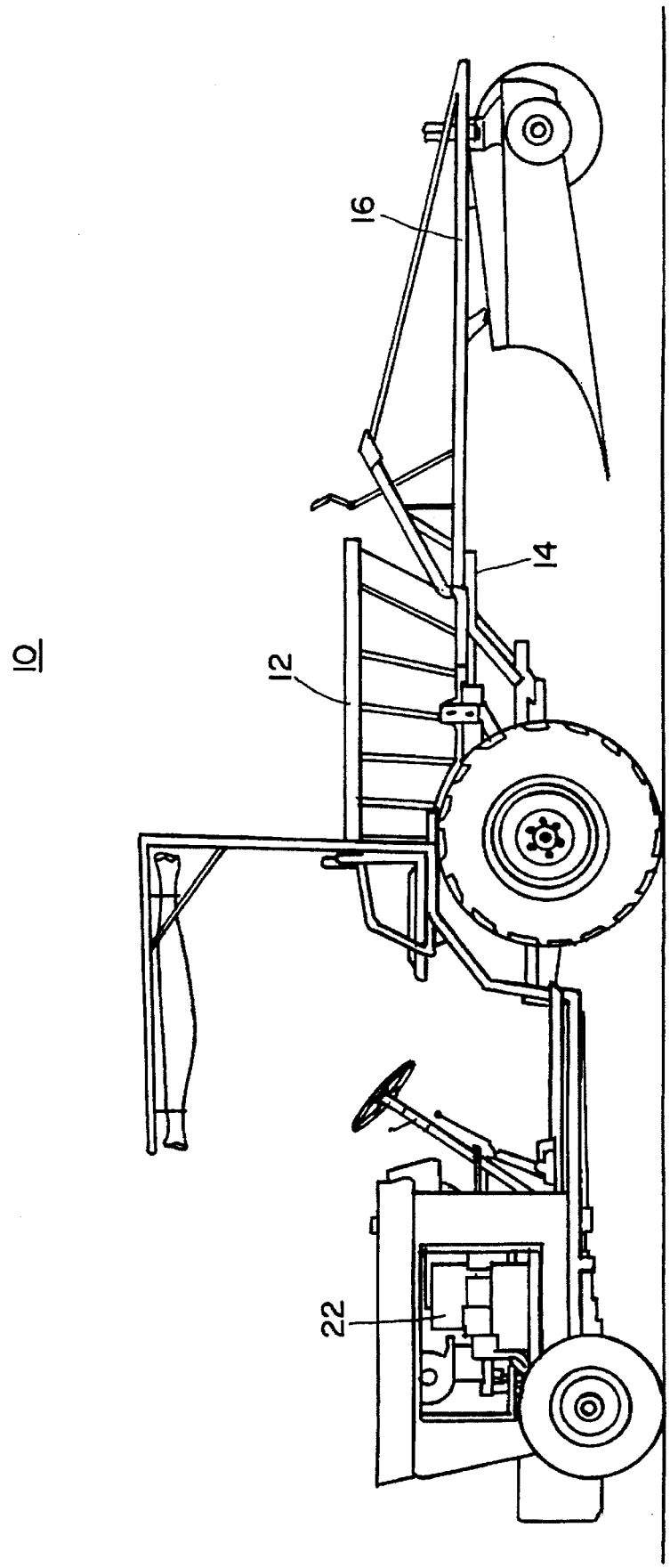
FIG. 1 is a schematic view of the combined tractor and dump track vehicle of this invention.
Figure 2:
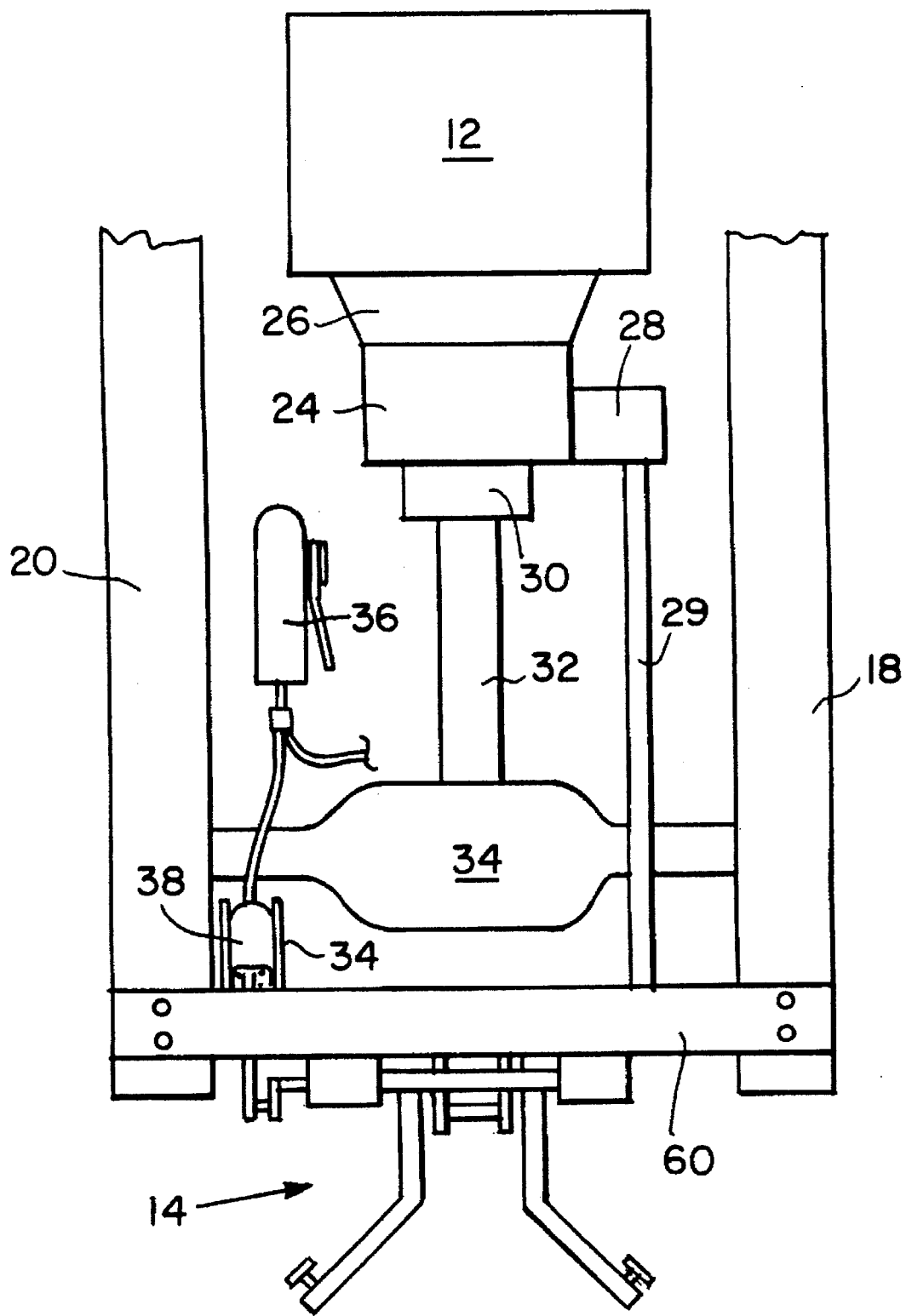
FIG. 2 is a schematic partial top view of the engine, drive train, and hydraulic system components of the combined tractor and dump truck vehicle of this invention also showing the self-contained, modular three-point hitch of this invention attached to the vehicle has chassis.

Combined tractor and dump truck vehicle 10, FIG. 1, according to this invention is particularly designed for use by farmers in third world countries: vehicle 10 incorporates inexpensive, readily obtainable, and easily maintainable and repairable components. Vehicle 10 features a dump truck bed 12 and a unique self-contained, modular three-point hitch 14 for operating farm implement 16. The self-contained, modular three-point hitch 14 is shown in FIG. 2 mounted on vehicle chassis frame members 18 and 20 and is designed so that it does not to interfere with the operation of dump truck bed 12, FIG. 1, also mounted on chassis frame members 18 and 20. Top plate 60 of hitch 14 is mounted on the chassis frame members and the remaining portion of the hitch extends below the top plate 60.

Engine 22, FIG. 2 is a "Lister TR-2" diesel engine connected to a Borg Wagner 8 T-9 four-speed transmission 24 through an SAE#3 clutch 26. Munci power take off (PTO) drive 28 is connected to transmission 24 as shown. An Auto-Gear model 11 two-stage reduction gear 30 connects drive shaft 32 to differential 34 which may be a Dana-Spicer Model 60 one ton axle. These components are all readily available and the only modification required is a simple adaptor plate used to connect clutch 26 to transmission 24 which is essentially a round metal plate with the appropriately positioned fastener holes; another similar fixture connects transmission 24 with reduction gear 30.

Figure 3:
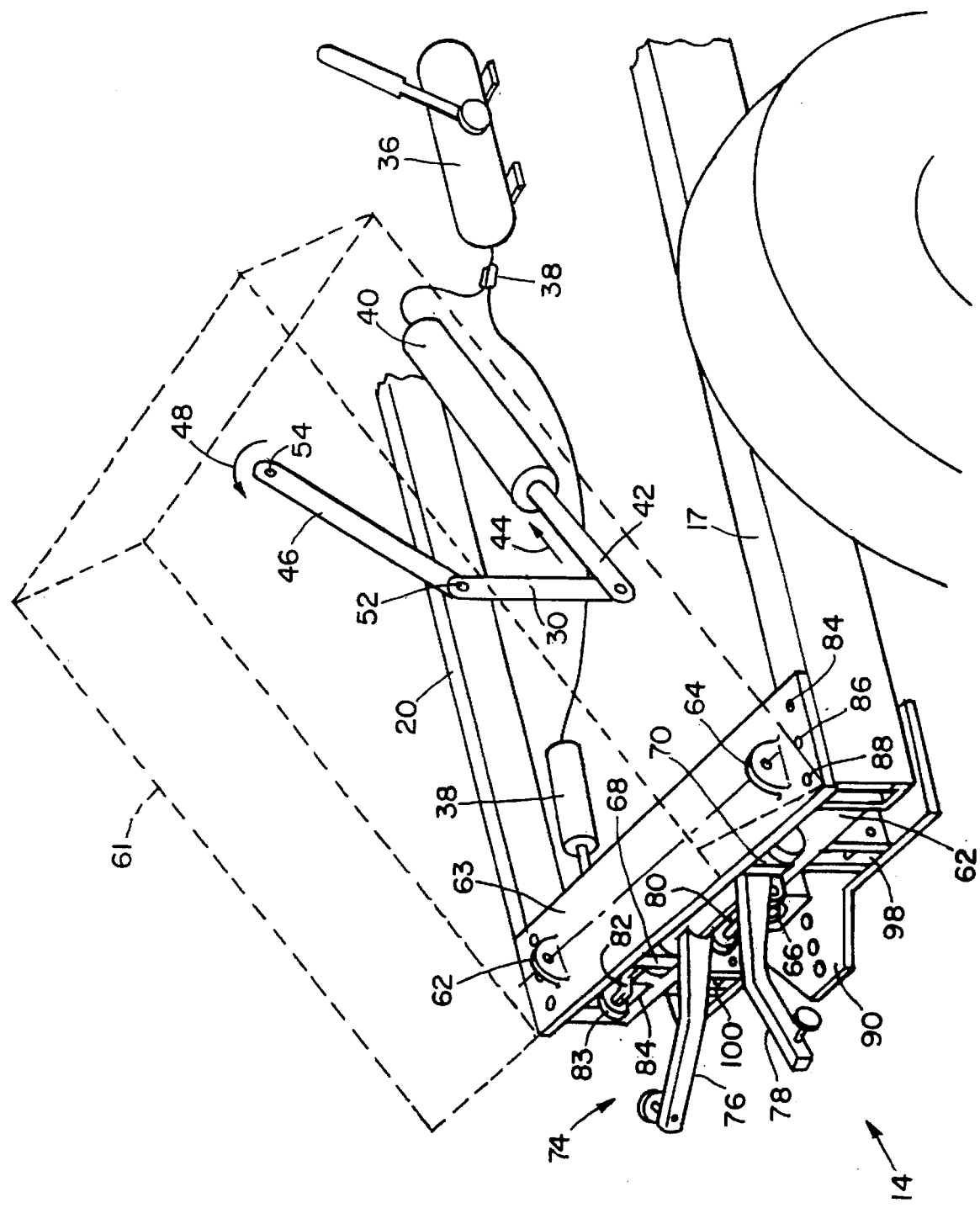
FIG. 3 is a more detailed schematic view of the hydraulic system for the vehicle of this invention showing the incorporation of a single hydraulic hand pump which operates both the dump truck bed lift assembly and the three-point hitch lifting arms.

One aspect of this invention is the use of hydraulic hand pump 36 used to drive lifting arm hydraulic cylinder 38 mounted in channel 34 of three-point hitch 14. Hand pump 36 also operates the dump truck bed 12 as shown in FIG. 3. Hand pump 36, FIG. 3, is connected via valve 38 to dump truck bed hydraulic cylinder 40 and three-point hitch lifting arm hydraulic cylinder 38. Valve 38 is a standard two-way valve modified with catch or dog 42 which flips down to hold valve 38 in position to power lifting arm hydraulic cylinder 38. Catch 42 must be manually unlatched to actuate truck bed hydraulic cylinder 40. A standard two-way valve is normally biased in the neutral position but in this invention, since the majority of the vehicle's time will be spent plowing, etc., valve 28 is conveniently held in the hitch-on position by catch 42.

Modular, self-contained three-point hitch 14 includes top plate 60 mounted on chassis frame members 18 and 20 and body portion 62 extending downward therefrom. Body portion 62 includes the main components of the three-point hitch resulting in a design which allows the self-contained, modular three-point hitch to be assembled on the chassis of the vehicle in an adjustable fashion without interfering with the operation of the dump truck bed. Moreover, dump truck bed pivot mounts 62 and 64 can be mounted directly on three-point hitch 14 as shown in FIG. 3. Three-point hitch 14 includes PTO drive bearing 66, a pair of lifting arm mounts 68 and 70, a fixed third point hitch 72, and fixed lower link assemblies 98 and 100. Lifting arm subassembly 74 is mounted in lifting arm mounts 68 and 70. Subassembly 74 includes lifting arms 76 and 78 mounted to outer tube 80 and lifting arm drive bar 82 extending within outer tube 80. Drive bar 82 includes lifting arm drive member 83 connected to the piston of lifting arm hydraulic cylinder 38 which extends through orifice 84 in hitch body 62.

Three-point hitch 14 can be adjusted with respect to chassis frame members 18 and 20 by means of fasteners 84, 86 and 88. Fixture 14 also preferably includes trailer ball mount 90.

Figure 4:
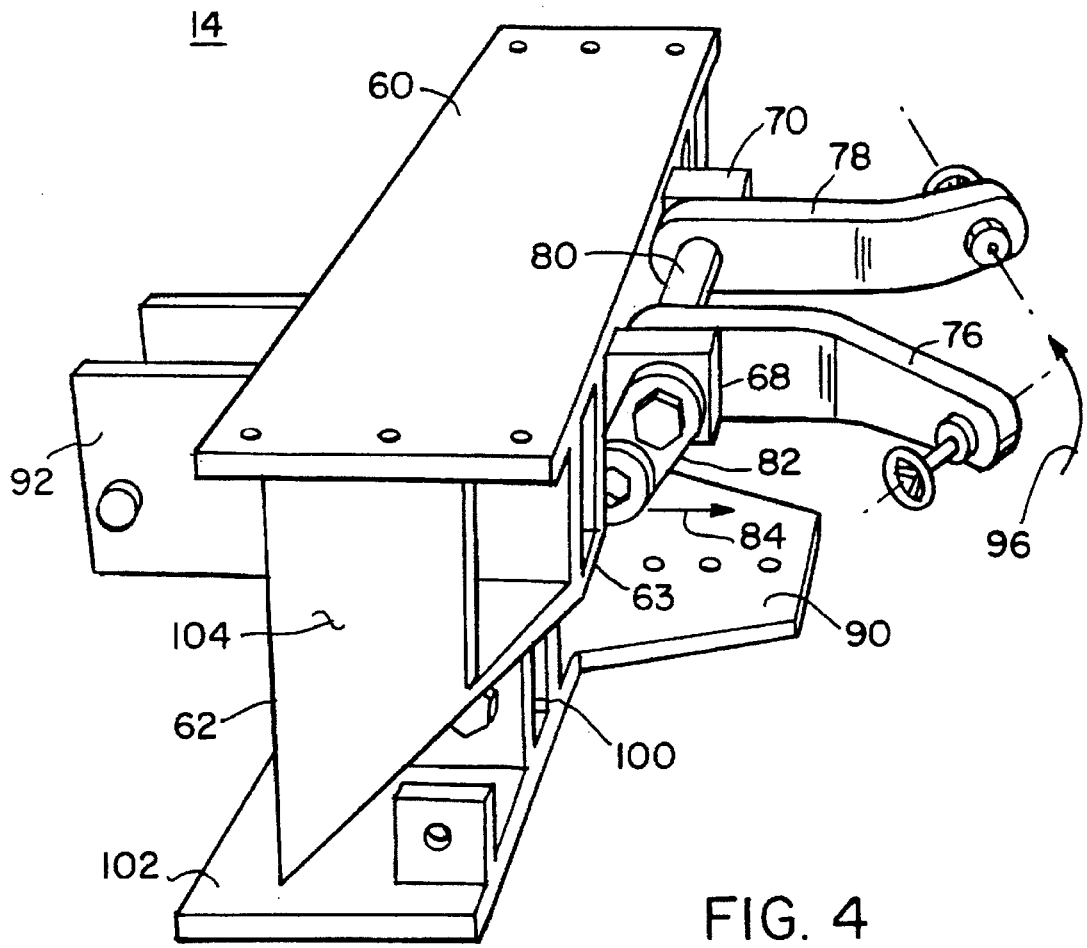
FIGS. 4 and 5 are left and right perspective views of the self-contained, modular three-point hitch of this invention.
Figure 5:
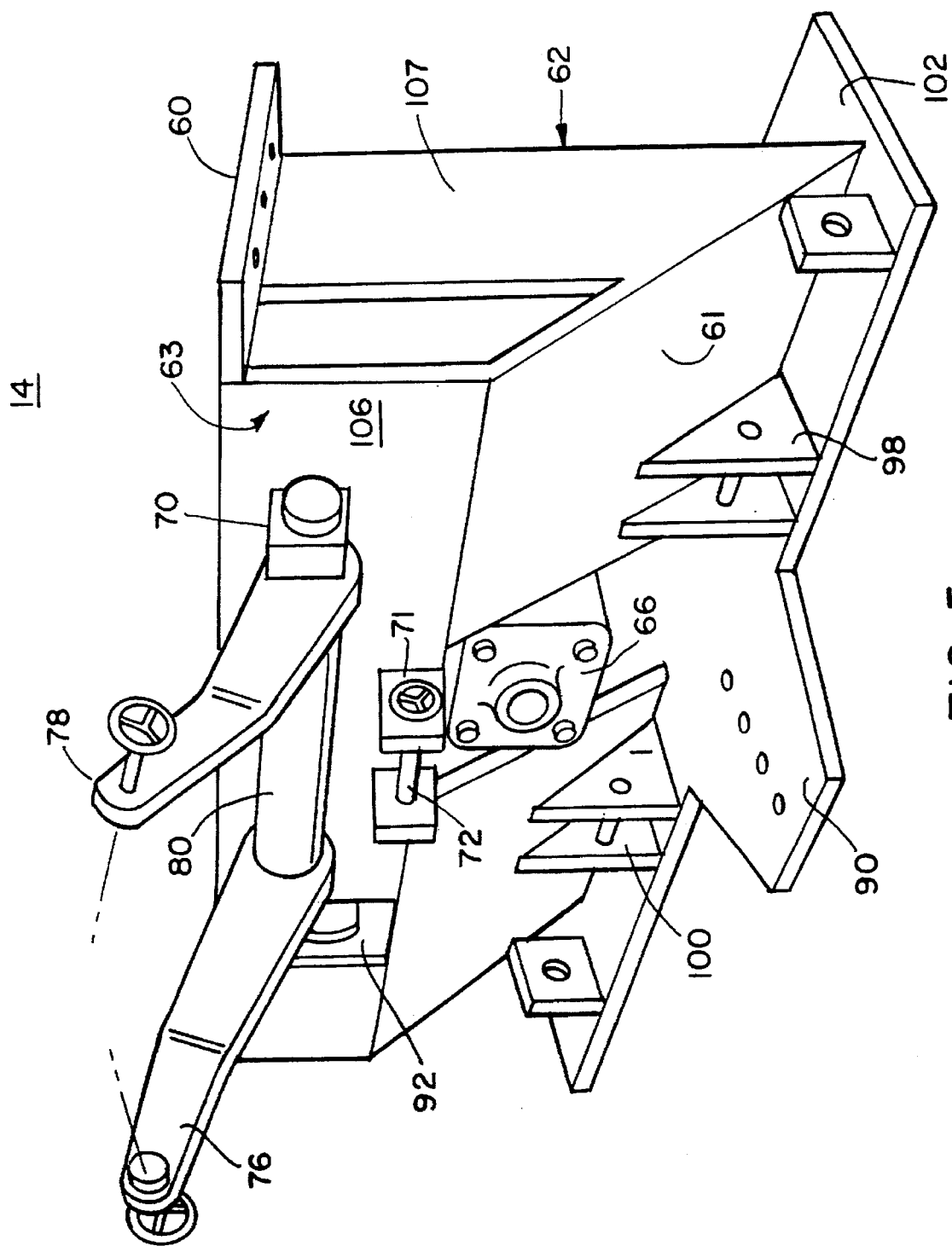

The various subassemblies of the self-contained, modular three-point hitch 14 of this invention are shown in more detail in FIGS. 4–5. Channel 92, FIG. 4, houses lifting arm hydraulic cylinder 38, FIG. 3, FIG. 7 connected to lifting arm drive member 83 in FIG. 4. Piston motion in the direction shown by arrow 94 rotates arms 76 and 78 upwards in the direction shown by arrow 96 to raise and lower a farm implement. Arm members 76 and 78 are fixed to outer tube 80 which pivots with respect to mounts 68 and 70 fixed to body 62.

Power take off drive beating 66, FIG. 5, is mounted centrally with respect to body 62 of hitch 14. The three-point hitch fixture of this invention also includes a pair of fixed lower link assemblies 98 and 100 as required for many farm implements. Top plate 60 is spaced from bottom plate 102 by side plates 104 and 107. Bottom plate 102 includes fixed lower link assemblies 98 and 100 and the lifting arm hydraulic cylinder is housed in channel 92 welded in place proximate side plate 104, FIG. 4. Front plate 106 is angled as shown in FIG. 5 properly positioning lifting arms 70 and 76 with respect to power take off bearing 66 for optimal lift and maneuverability.

Side plates 104 and 107 interconnect the top 60 and bottom 102 plates. Front plate 63 includes flat portion 106 and angled portion 61. Lifting arm mounts 68 and 70 are fixed to flat portion 106 which also includes third point hitch mounting bracket 71. Angled portion 61 includes lower link fixtures 98 and 100. Channel 92 housing lifting arm hydraulic cylinder extends rearward from side plate 104 as shown in FIG. 4. In the prototype design, angled portion 61, FIG. 5, of front plate 106 is angled at 45° to respective bottom plate 102. The center of lifting arm mount 70 is 2.5 inches from the top plate 60 and 2.5 inches higher than the center link of third link mounting bracket 71. The center of lower link mounting bracket 98 is 7.5 inches from the top of angled portion 61 of front plate 106. The overall height of the fixture is approximately 15 inches. Bottom plate 102 is approximately 35.43 inches long and approximately 10 inches wide with a 4 inch by 6 inch extension 90 in the middle thereof for trailer ball hitch mount 90. Top plate 60 is approximately 9 inches by 35.43 inches. These dimensions may vary depending on the design of the actual vehicle chassis.

Figure 6:
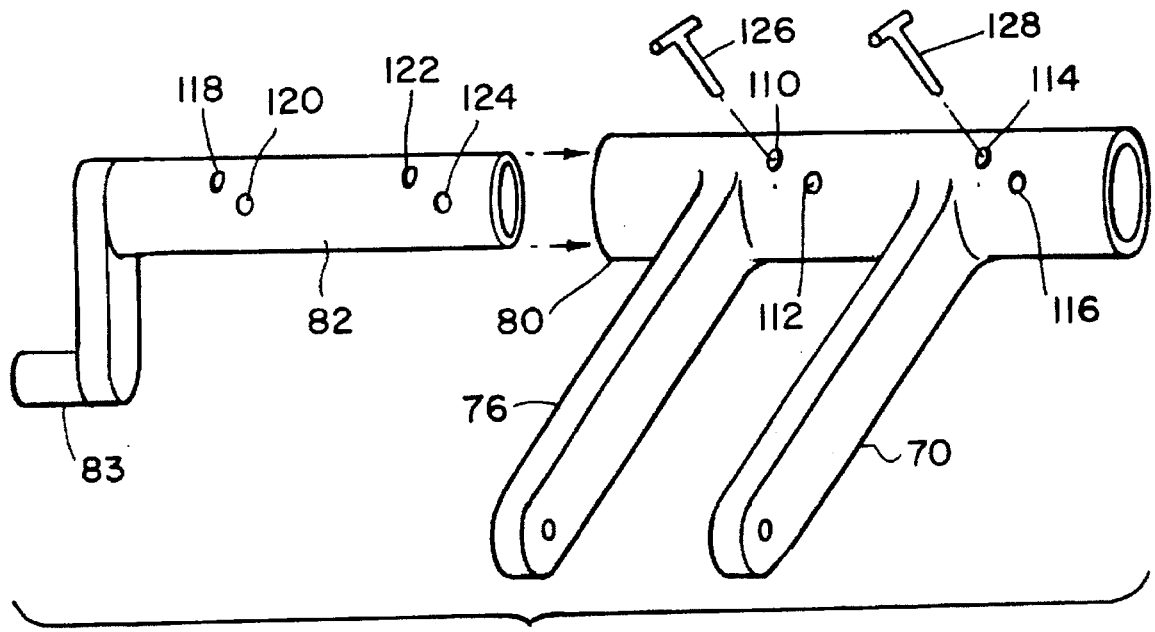
FIG. 6 is a schematic view of the adjustable-height, lifting-arm subassembly according to this invention.

This invention also features means for adjusting the maximum lift of lifting arms 70 and 76, FIG. 6. There is a pair of offset orifices 110 and 112 through the surface of outer tube 80 and another pair of offset orifices 114 and 116 spaced from orifices 110 and 112 as shown. Lifting arm drive bar 82 is receivable within outer tube 80 and includes complementary pairs of offset orifices 118, 120, 122 and 124. When fastener 126 is placed in orifice 110 of outer tube 80 and through orifice 118 of lifting arm drive bar 82 and fastener 128 is placed through orifice 114 and through orifice 122, the maximum drive of arms 70 and 76 will be one height but the farmer can readily adjust that maximum height to higher maximum height by placing fasteners 126 and 128 through orifices 112 and 120, and 116 and 124, respectively. In this way, the maximum lift of lifting arms 70 and 76 is quickly adjusted in the field depending on the specific farm implement used and/or the condition of the sod.

Figure 7:
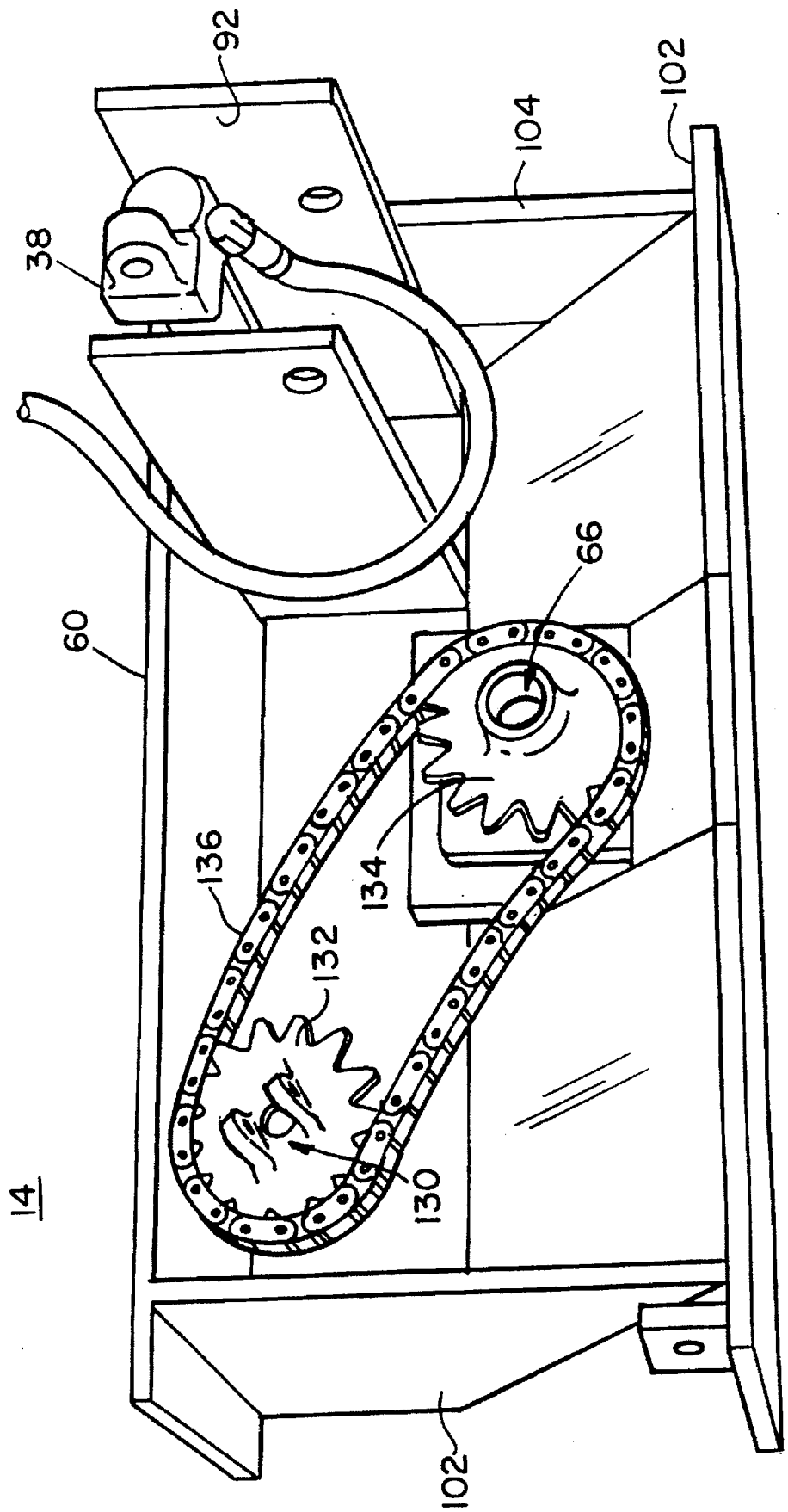
FIG. 7 is a schematic view of the drive gear subassembly of the self-contained, modular three-point hitch of this invention.

Another aspect of this invention results from the realization that when a standard PTO drive 28, FIG. 2, is used in order to keep cost parts low and standardized, PTO shaft 29 is offset with respect to the middle of the back of the vehicle as shown. Shaft 29 can be angled to fit within PTO drive beating 66, FIG. 7 of fixture 14, but that would require redesign of differential 34, FIG. 2 and also a loss of power and torque. Therefore, as shown in FIG. 7, three-point hitch fixture 14 includes PTO shaft housing connector 130 and gear 132 affixed thereto. A second drive gear 134 is connected to the rear of PTO drive beating 66. Chain 136 connects the two drive gears so that when PTO shaft 29, FIG. 2, turns housing 130, chain 136 on gear 132 turns PTO drive bearing 66. Various farm implements are powered by means of the PTO extending through PTO drive bearing 66. This design of a modular three-point hitch is uniquely adapted for operating irrigation pumps and the like. FIG. 7 also more clearly shows channel 92 housing lift arm hydraulic cylinder drive 38.

This design of a three-point hitch results in a self-contained modular unit which can be attached to many different modular frames and can be adjusted and removed as required. The low profile design of such a hitch assures that the hitch does not interfere with the operation of a dump truck bed. Unlike prior three-point hitch designs, the three-point hitch of this invention is self-contained and modular: the power take off, the lifting arms, and the lifting arm drive device are all integral with the hitch fixture. It can be removed for storage or repair, adjusted on the vehicle chassis for optimum operation of various farm implements, and it can be moved from one vehicle to another.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A self contained, modular three-point hitch comprising:
   a three-point hitch fixture including:
      a power take off drive bearing,
      a pair of lifting arm mounts,
      a fixed third point hitch, and
      a channel housing a lifting arm drive device;
   a lifting arm subassembly mounted in said lifting arm mounts, said lifting arm subassembly comprising:
      a pair of lifting arms mounted to an outer tube, and
      a lifting arm drive bar extending within said outer tube, said drive bar including a lifting arm drive member connected to said lifting arm drive device; and
   means for adjusting the maximum lifting height of said lifting arms including:
      a plurality of offset orifices through the surface of said outer tube,
      a complementary plurality of offset orifices through said drive bar, and
      a pair of fasteners extendable through said orifices.

2. A self-contained, modular three-point hitch for mounting on a vehicle chassis, said hitch comprising:
   a top plate connectable to said chassis; and
   a fixture body extending downwards from said top plate, said body including:
      a power take off drive bearing,
      a pair of lifting arm mounts,
      a fixed third point hitch, and
      a lifting arm subassembly mounted in said lifting arm mounts;
   said fixture body including a bottom plate, side plates interconnecting said top plate and said bottom plate and a front plate with a flat portion and an angled portion; and
   a lifting arm drive device channel mount extending transversely with respect to said side plates rearward from said front plate.

3. A self-contained, modular three-point hitch for a vehicle chassis, the hitch comprising:
   a horizontal top plate extending between opposing frame members extending from the vehicle chassis, said horizontal top plate mountable on the frame members;
   a plurality of fastener holes in said top plate for adjusting said top plate with respect to the vehicle chassis;
   a horizontal bottom plate spaced from the top plate; and
   a front plate extending vertically between said top plate and said bottom plate, said front plate including:

a power take off drive bearing;

a pair of lifting arm mounts;

a fixed third point hitch; and a lifting arm subassembly mounted in said lifting arm mounts.

4. A self-contained, modular three-point hitch for a vehicle chassis, the hitch comprising:

a horizontal top plate extending between opposing frame members extending from the vehicle chassis, said horizontal top plate mountable on the frame members;

a horizontal bottom plate spaced from the top plate;

a front plate extending vertically between said top plate and said bottom plate, said front plate including:
a power take off drive bearing;
a pair of lifting arm mounts;

a fixed third point hitch; and a lifting arm subassembly mounted in said lifting arm mounts, said lifting arm subassembly including:

a pair of lifting arms mounted to an outer tube;

a lifting arm drive bar extending within said outer tube; and a means for adjusting the maximum lifting height of said lifting arms, said means for adjusting including:

a plurality of offset orifices through the surface of said outer tube;

a complimentary plurality of offset orifices through said drive bar; and a set of fasteners extendable through said orifices.

* * * * *